(12) United States Patent
Riva et al.

(10) Patent No.: US 6,554,933 B2
(45) Date of Patent: Apr. 29, 2003

(54) BEAD CORE WITH A CLAMP, TIRE INCORPORATING SAME, AND METHOD OF MAKING SAME

(75) Inventors: Guido Riva, Milan (IT); Gurdev Orjela, Arlon (BE); Syed Khawja Mowdood, Hudson, OH (US); Alessandro Volpi, Milan (IT); Claudio Villani, Milan (IT)

(73) Assignee: Pirelli Pneumatici S.p.A., Milan (IT)

( * ) Notice: Subject to any disclaimer, the term of this patent is extended or adjusted under 35 U.S.C. 154(b) by 46 days.

(21) Appl. No.: 09/843,075

(22) Filed: Apr. 27, 2001

(65) Prior Publication Data

US 2002/0026974 A1 Mar. 7, 2002

Related U.S. Application Data

(63) Continuation of application No. PCT/EP99/08027, filed on Oct. 22, 1999.
(60) Provisional application No. 60/107,388, filed on Nov. 6, 1998.

(30) Foreign Application Priority Data

Oct. 30, 1998 (EP) .............................. 98120554

(51) Int. Cl.[7] ........................ B60C 15/04; B29D 30/48
(52) U.S. Cl. ........................ 156/136; 152/540; 245/1.5
(58) Field of Search ................ 152/539, 540; 156/136; 245/1.5

(56) References Cited

U.S. PATENT DOCUMENTS 1,565,617 A * 12/1925 Beyea ..................... 245/1.5

6,413,637 B2 * 7/2002 Cipparrone et al. ........ 428/379

FOREIGN PATENT DOCUMENTS

| DE | 2406047 | * | 10/1975 |
| DE | 2820191 | * | 11/1978 |
| DE | 3416060 A1 | | 10/1985 |
| DE | 3829460 A1 | | 3/1990 |
| DE | 3829460 | * | 3/1990 |
| JP | 04362401 | * | 12/1992 |
| JP | 05024418 | * | 2/1993 |
| JP | 05125632 | * | 5/1993 |
| JP | 09207525 | * | 8/1997 |
| WO | 0433917 | * | 6/1991 |

OTHER PUBLICATIONS

Wayman, C. M., et al., "An Introduction to Martensite and Shape Memory," Engineering Aspects of Shape Memory Alloys, published by Butterworth–Heinemann, London, 1990, pp. 3–129.

* cited by examiner

Primary Examiner—Jeff H. Aftergut
Assistant Examiner—Justin Fischer
(74) Attorney, Agent, or Firm—Finnegan, Henderson, Farabow, Garrett & Dunner, L.L.P.

(57) ABSTRACT

A tire includes a carcass, a tread band, at least a reinforcing belt between the tread band and the carcass, a pair of bead cores disposed one at each end of the carcass with ends of the carcass wrapped around the pair of bead cores to form a pair of beads, and at least one clamp disposed around each bead core, wherein the at least one clamp is made of a shape-memory material. A bead core including at least one clamp made of a shape-memory material, a method for manufacturing a tire including at least one clamp made of a strip of shape-memory material, and a method for manufacturing a bead core including at least one clamp made of a strip of shape-memory material are also disclosed.

20 Claims, 5 Drawing Sheets

BEAD CORE WITH A CLAMP, TIRE INCORPORATING SAME, AND METHOD OF MAKING SAME

CROSS-REFERENCES TO RELATED APPLICATIONS

This application is a continuation of International Patent Application No. PCT/EP99/08027, filed Oct. 22, 1999, in the European Patent Office; additionally, Applicants claim the right of priority under 35 U.S.C. §119(a)–(d) based on patent application No. 98120554.5, filed Oct. 30, 1998, in the European Patent Office; further, Applicants claim the benefit under 35 U.S.C. §119(e) based on prior-filed, copending provisional application No. 60/107,388, filed Nov. 6, 1998, in the U.S. Patent and Trademark Office; the contents of all of which are relied upon and incorporated herein by reference.

BACKGROUND OF THE INVENTION

1. Field of the Invention

The present invention relates to a clamp for the bead core of a tire, such as a band, thread, bead core gripping means, or the like. The present invention also concerns a tire incorporating such a clamp in its structure and is directed to a method for making same.

2. Description of the Related Art

As is known, a tire includes the carcass, the tread band, and a belt structure between the tread band and the carcass. The carcass, usually at least a single ply, is turned out at its ends around a pair of bead cores. The bead cores, the ends of the carcass, and whatever filler that may be added between the bead cores and carcass work together as a unit to form the beads on either side of the tire.

When in use, a tire is placed on a wheel rim, which has two seats axially displaced from one another. The two beads on either side of the tire are designed to rest on the two rim seats. Each of the rim seats terminates in an end flange, which has an outermost diameter greater than the diameter of the wheel rim and also greater than the diameter of tire beads. The end flanges prevent the beads of the tire from slipping off of the rim during use.

Since each bead core and associated bead have smaller diameters than the outermost diameter of the vertical end flanges, the tire bead must be elliptically deformed so that the tire can be installed on the rim. Methods for elliptically deforming the tire bead are well known to those of ordinary skill in the art. Once the tire bead is sufficiently deformed that the elliptical axis of the bead is greater than the diameter of the vertical flange, the bead can be slipped over the end of the flange and the tire can be positioned on the rim.

Once on the rim, the tire beads are positioned one on each seat. The rim seats have gradually divergent, axial cross-sections. As a result, the beads are able to grip firmly onto their respective rim seats due to an elastic reaction between the bead cores and the gradually divergent rim seats as the bead cores are gradually forced onto the rim seats until they are finally positioned adjacent to the end flanges. The elastic gripping force of the beads is augmented once the tire is inflated and the external sides of the beads are pushed against the lateral flanges by the air pressure within the tire. The tire's ability to grip firmly onto the tire rim is a fundamental safety feature of a tire's design.

The bead core in a tire may take many different forms. For example, the bead core may comprise a plurality of plain metal wires (i.e., wires with a circular cross-section) bundled together. Alternatively, the bead core be made from a number of reinforcing elements that are strap-shaped or, in the case of large-sized tires, the bead core may include a number of quadrangularly or hexagonal sectioned metal straps. For large-sized tires, the bead core is formed by winding a metal strap repeatedly around a drum until several concentric coils are formed. When constructed in this manner, the bead core essentially is made of a first ring superposed by several others, each of which is formed by winding an additional layer of the metal strap onto the one that precedes it.

In another bead construction contemplated for large-sized tires, the bead comprises a group of radially superposed coils formed by winding a hexagonally-sectioned metal strap over itself to form radially superposed coils. The superposed coils form groups of rings arranged axially side by side. So that the adjacent rings may be wedged into one another, the radially superposed coils are radially grooved between one another. Lastly, the free, internal radial edges of the flanked coils lie on a straight line inclined, for example at 15° for trucks and at 5° for cars, to the wheel axis, allowing the beads, of which the coils are an integral part, to be mounted onto the respective bead seats, which have the same incline angle.

During the manufacture of a tire and during its normal operation, the bead cores of a tire are subjected to a variety of external stresses, such as high temperature and pressure. Mechanical forces act on the bead core as the individual components of a tire are assembled to form the final product. As a result, the different components of the bead core (i.e., the concentrically wound wires, straps, or tapes) may become misaligned or can lose the ability to resist torsional stresses. Should this occur, the bead core will not function adequately because the bead core will not be able to generate the necessary gripping force between itself and the rim seats, especially if the bead does not include suitable annular gripping means.

To compensate for this, clamps or gripping means are added around portions of the bead core. These clamps or gripping means function annularly to mutually compress the various elements of the bead core. They provide a reciprocal compacting force that helps the bead to firmly grip the rim seat. Many suitable clamps or gripping means for bead cores are known such as wire fabrics, nylon threads, high viscosity compounds, semivulcanized compounds applied around the bead core (for vehicle tires), or steel bands or metal strip coated with brass or zinc also disposed around the bead cores (for large-sized tires).

The clamp made from metal strip is first cut to a predetermined length, the two ends are then shaped in the form of hooks, the strip is wound onto itself around the bead, and the hooks are linked together. Alternatively, the ends of the strip may be soldered together. Finally, irrespective of how the ends of the clamp are connected to one another, the clamp may be pounded so that it is adequately banded over the bead.

Regardless of the manner in which the particular clamp or gripping means is formed, once assembled, the clamp forms an annular band corresponding to the peripheral dimension of the bead core. The band, just as with other similar clamps or gripping means, will exert a compacting force on the various elements of the bead core so that they do not become misaligned or loosened either during the manufacture of the tire or during operation of the tire.

SUMMARY OF THE INVENTION

While attempting to solve the problems with the prior art, it was observed that the clamps or similar elements of the bead core lose some of their gripping power over time. The reasons for this are unclear, but it is believed that stresses resulting from the handling of the bands during manufacture might play a significant role. Moreover, it is believed that loss of gripping strength may be attributable to the heating operation during vulcanization or during operation of the tire once installed on the tire rim. It is difficult to attribute the loss of gripping power of the band to any particular source because it does not correlate directly with any thermal phenomenon or even any mechanical phenomenon. Despite this, it was believed that a material for clamps could be found that was sensitive to the effects of temperature that also could compensate for the aforementioned loss of gripping strength.

Subsequently, it was thought that a material sensitive to temperature variations might be used in the manufacture of the bands or gripping means themselves so that the bands might react by generating a stress of contraction proportional to the variation in the gripping strength. In this way, the gripping strength of the clamp would be proportional to the need for a compacting force on the bead core elements. In other words, it was believed to be beneficial to use a material capable of providing a high gripping strength during the vulcanization process and during the operation of the tire so that the elements of the bead core would not be upset at the high temperatures and pressures experienced in each environment. Such a solution would also be consistent with the demand for a bead that tightly grips the rim seat at ambient temperatures but also would be consistent with a material that displays a certain degree of deformability at ambient temperature when it is necessary to deform the bead core so that it can be mounted to the tire rim.

It was then thought that the problem could be solved by resorting to annular clamps or gripping means made from an alloy of a shape-memory material. As a result, one embodiment of the present invention contemplates the inclusion of an annular clamp or gripping means made from a shape-memory alloy arranged around the bead core of a tire. Such an alloy for the gripping means is not only deformable at ambient temperature but contracts at a temperature above ambient to recover its previously memorized shape. Once the material contracts, it maintains this magnitude of the force of contraction as the material cools from the higher temperature to the ambient temperature.

Preferably, the gripping means comprises at least one wire. More particularly, the gripping means comprise at least one metal strap bent at the ends in the form of hooks which are linked together in the closed position around the bead core.

The present invention also provides a procedure for the manufacture of the clamp or gripping means around the bead core of a tire bead. The procedure includes a number of steps from winding the strip around the bead core, locking the ends of the strip together around the bead core to form a closed clamp or gripping means, and applying compression forces to the clamp to band the gripping means over the bead core. This process requires that the metal strip be made from a shape-memory alloy deformed by elongation relative to a previously memorized plane shape. The clamp is then heated to a predetermined temperature at which the shape-memory material transitions from a first structure to a second structure, different from the first, at which time the shape-memory alloy tends to recover the previously memorized shape and can exert a stress of contraction on the bead core.

Preferably, the procedure is characterized by heating the gripping means to a predetermined temperature $A_s$, which corresponds to the start of the transformation of the shape-memory material from a martensitic structure to an austenitic structure. Again preferably, the procedure is characterized by the fact that the temperature $A_s$ is between 50 and 150° C.

The procedure for manufacturing the bead core gripping means should be particularly suited to the vulcanization phase of tire manufacture. The vulcanization of a tire usually occurs at a temperature between 140 and 180° C., which corresponds to a stress of contraction of the gripping means over the bead core of at least 200 MPa. As mentioned, this interaction is desired because it helps to keep the various bead core elements compact, so that such elements are not upset by their position.

Yet another aspect of the invention lies in manufacture of a tire having a carcass, a tread band, a belt structure between the tread band and carcass, a pair of bead cores, and at least one clamp or bead core gripping means around each bead core. The carcass includes a backing with ends unrolled surrounding the bead cores to form a pair of beads. The clamp or gripping means wrapped around the bead core is to be made of a shape-memory alloy. In this embodiment of the invention, it is contemplated that the bead core is formed of several rings or metal straps, radially staggered side by side, of radially superposed coils with a substantially hexagonal cross section.

Even more preferably, the tire of this particular embodiment of the present invention is characterized by the fact that, at temperature $A_f$, which is between 70 and 200° C., corresponding to the structure's complete transformation from its martensitic state to its austenitic state, the bead core gripping means manifests a stress of contraction over the bead core of value $\sigma_{max}$, which is between 100 and 600 MPa.

Finally, as the beads heat up during normal operation on a tire rim, the magnitude of the above-mentioned stress favorably allows the various elements of the bead core to become more compacted, thus assuring that the tire beads grip onto the seats of the wheel rim.

DESCRIPTION OF THE DRAWINGS

The accompanying drawings, which are incorporated in and constitute part of the specification, illustrate several embodiments of the invention, and, together with the general description given above and the detailed description of the embodiments given below, serve to explain the principles of the present invention.

In the drawings.

DESCRIPTION OF THE PREFERRED EMBODIMENTS

Figure 1:
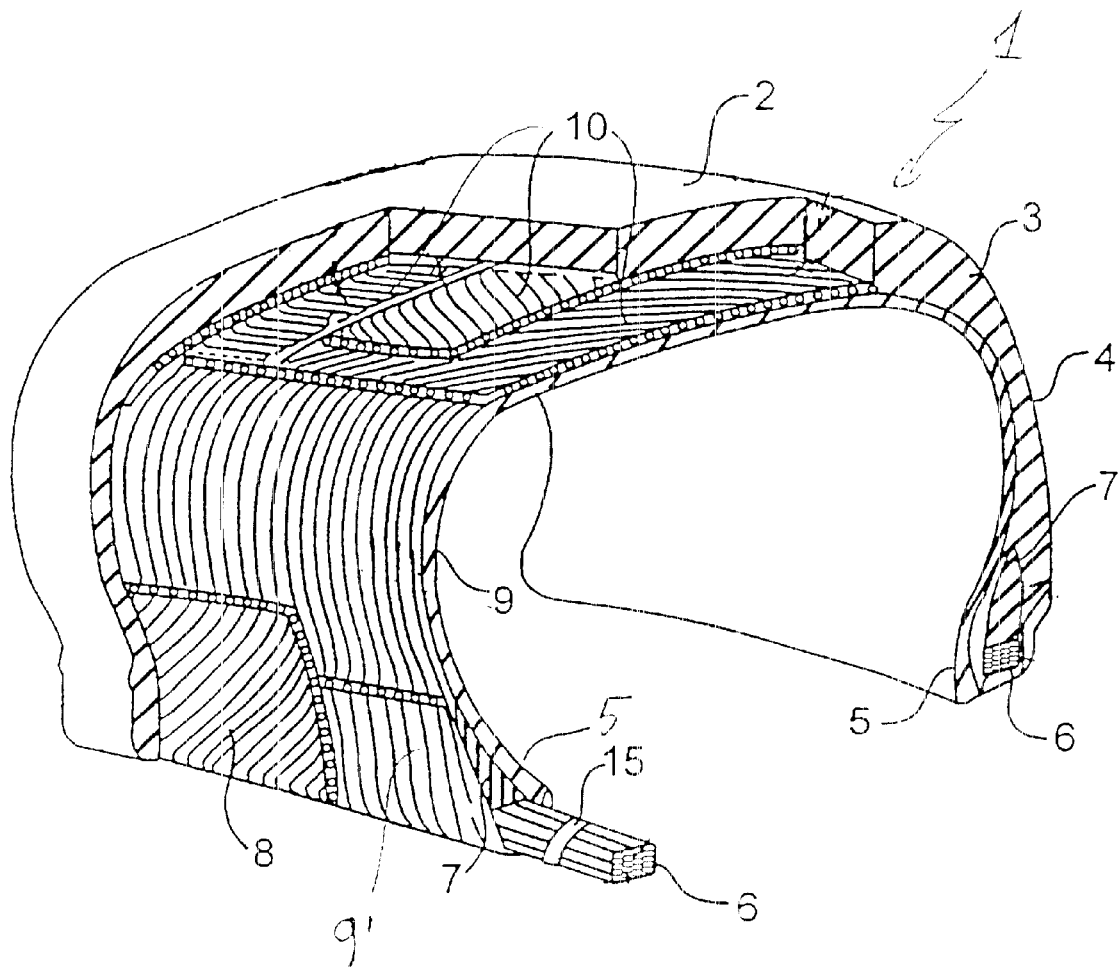
FIG. 1 illustrates, in a partial perspective view with sections removed, a tire according to the present invention with clamp or bead core gripping means shown disposed around one of the bead cores.

FIG. 1 depicts a commercial tire 1. Tire 1 includes tread band 2 connected to sidewalls 4 through shoulders 3. A pair of beads 5 are located at the ends of tire 1. Beads 5 include bead cores 6, bead fillers 7, and reinforcement borders 8. Tire 1 further comprises radial carcass 9, with thin cords arranged in meridian planes, and belt structure 10 arranged between the carcass and tread band 2. Belt structure 10 is shown with three layers of thin cords oriented in the manner illustrated in FIG. 1. Carcass 9 is formed with one or more carcass plies backings folded outwardly with edges 9' wrapping around bead cores 6.

Bead core 6, as shown in FIG. 1, is constructed from a plurality of radially wires each of which has a quadrangularly-shaped cross-section. Such wires are held together by annular clamps or gripping means 15, only one of which is illustrated in the figure. While a band-type gripping means is illustrated, it should be understood that clamps 15 may be created in any one of a number of different geometries, such as a group of wires, wire belts, or the like, without departing from the spirit and scope of the present invention.

No matter what particular geometry is used, according to the present invention, clamps 15 are made of a shape-memory alloy having characteristics determined by structural transformations effected at determined temperatures and typical of the alloy used. In general, each alloy has its own transformation diagram, which can be used to predict the transformation from a martensitic structure to an austenitic structure and vice versa as a function of temperature. One such example is provided in FIG. 2.

Figure 2:
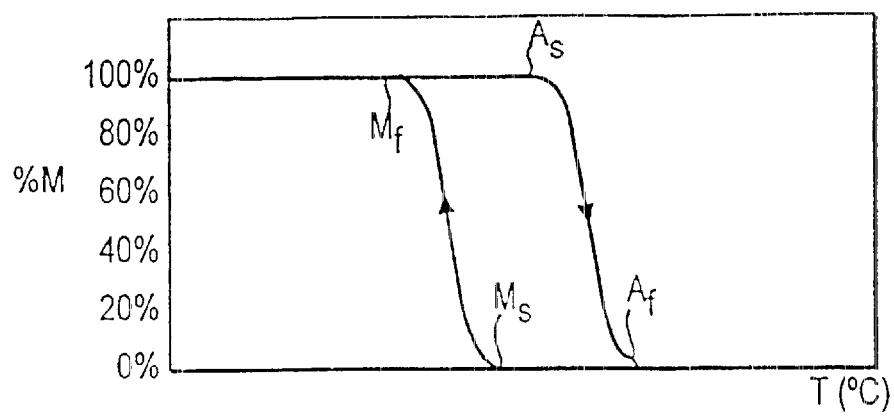
FIG. 2 qualitatively illustrates, as a function of temperature, the structural transformation of a shape-memory material of the type from which the clamp of the present invention is constructed.

The ordinates for the graph of FIG. 2 report the percentage values of the martensitic structure M. The graph in FIG. 2 shows the passage from a 100% martensitic structure (M) to a totally austenitic structure and vice versa. As the temperature of the shape memory alloy is varied, the alloy will transform from the martensitic structure to the austenitic structure and back again, according to the arrows shown in FIG. 2.

The martensitic to austenitic transformation begins when the shape memory alloy reaches the temperature $A_s$ and ends when the temperature reaches $A_f$. Once the alloy is cooled, the material structure transforms from the austenitic structure at temperature $A_f$ to the martensitic structure. The transformation to the martensitic structure begins at temperature $M_s$ and is completed when the alloy reaches temperature $M_f$.

From the transformational behavior of the material, the mechanical characteristics of that material can be determined. In particular, the transformation of the material's structure, obtained by heating from the temperature $A_s$ to the temperature $A_f$, generates stresses in the material that tend toward the recovery of a previously memorized shape.

The shape-memory material may take any from a number of different compositions such as a NiTi alloy, a NiTiX alloy (where X is any one of Fe, Cu, or Nb), a FeNiCoTi alloy, a FeMnSi alloy, a CuZnAl alloy, a CuAlNi alloy, a CuAlBe alloy, a FeMnSi-based alloy, or a FeNiCo-based alloy, to name a few. In the preferred embodiment of clamp 15 shown in FIG. 1, the metal strap may have a thickness of between 0.3 and 0.7 mm and a width of between 5 and 20 mm.

Shape-memory materials of the type contemplated for the present invention are discussed and defined in the publication, "Engineering Aspects of Shape Memory Alloys" published by Butterworth-Heinemann, London (Ed. T. W. Duerig) (1990). Those materials, however, need not be the only materials used in the construction of clamp 15. To improve adhesion between clamp 15 and the surrounding rubber in tire 1, clamp 15 may be coated by any number of materials including: copper with other metals, a combination of copper and zinc with other metals, tin with other metals, zinc with other metals, nickel or cobalt with other metals, or cool plasma deposition of copper or a combination of copper and zinc with steel, to name a few.

Figure 3:
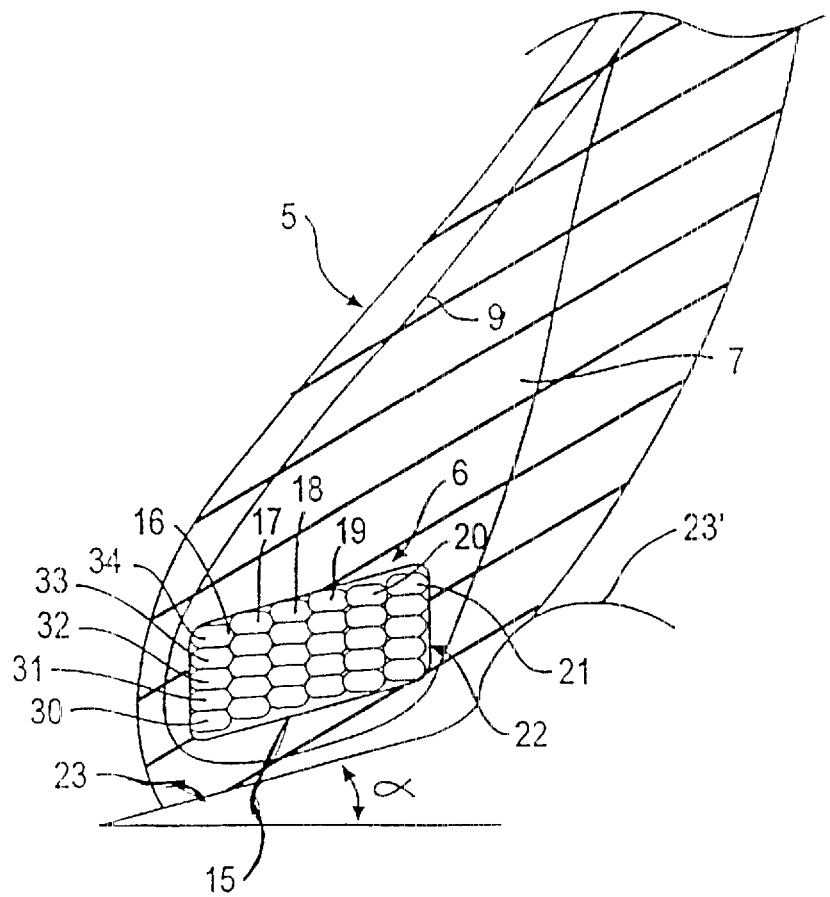
FIG. 3 is a cross-sectional, partial illustration of a tire bead according to the present invention, which is shown positioned on a wheel rim.

One alternate embodiment of the present invention is shown in FIG. 3. There, the construction shown is suitable for a tubeless-type large-sized tire. As illustrated, bead core 6 is formed by a group of six rings 16, 17, 18, 19, 20, and 21 placed side by side. Each ring 16–21 is formed with five superposed radial coils 30, 31, 32, 33, and 34, each with a hexagonally-shaped cross-section.

The various coils 30–34 of the side-by-side rings 16–21 are held together by clamp 15 of a shape-memory material. The superposed coils of rings 16–21 are staggered side by side, with adjacent rings 16–21 being radially staggered in relation to one another a distance equal to half of the thickness of one of the individual metal straps 22 that form coils 30–34 and that also form rings 16–21. When coils 30–34 are arranged in this manner, metal straps 22 become wedged into each other with the free edges of coils 30–34 lying on a straight line inclined at a predetermined angle $\alpha$ with respect to an axis of rotation of the wheel. Angle $\alpha$ is equal to the angle of inclination of bead 5 of tire 1 mounted on rim seat 23, as illustrated in FIG. 3. The preferred magnitude of angle $\alpha$ is 15° for trucks and 5° for cars. The outside edge of bead 5 abuts a stop on flange 23' of the rim.

Bead core 6 shown in FIG. 3 may be constructed by winding a number of metal straps 22 over a wrapping drum having an external support surface with cylindrical steps, so as to create bead core 6 with a base inclined at 15°. Metal straps 22 are each wound into several radially superposed rings 16–21 that are radially staggered so that they are linked to one another through a wedging effect between individual metal straps 22 set side-by-side.

Figure 4:
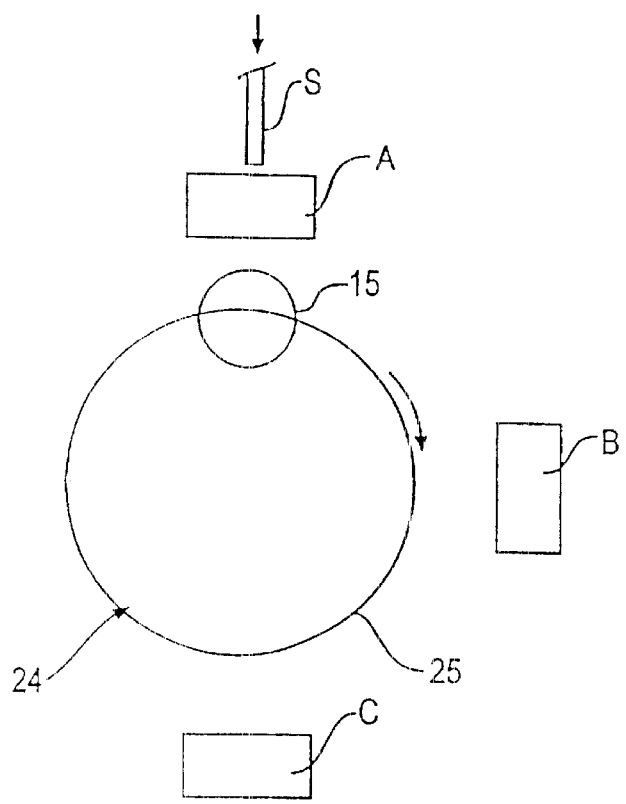
FIG. 4 is a schematic block diagram of an apparatus according to the teachings of the present invention for applying bead core clamps or gripping means to the bead cores of a tire.

FIG. 4 depicts one embodiment of apparatus 24 that may be used to apply bead core clamp 15 to bead core 6. Apparatus 24 includes a platform 25, on which is placed the bead core 6, that rotates around a vertical axis. Three stations, A, B, and C, are arranged radially around platform 25. Bead core 6 is locked onto platform 25 by any known type of means (not illustrated), such as a collect system or the like. As one example, bead core 6 is positioned with its own axis parallel to the axis of the platform.

Figure 5:
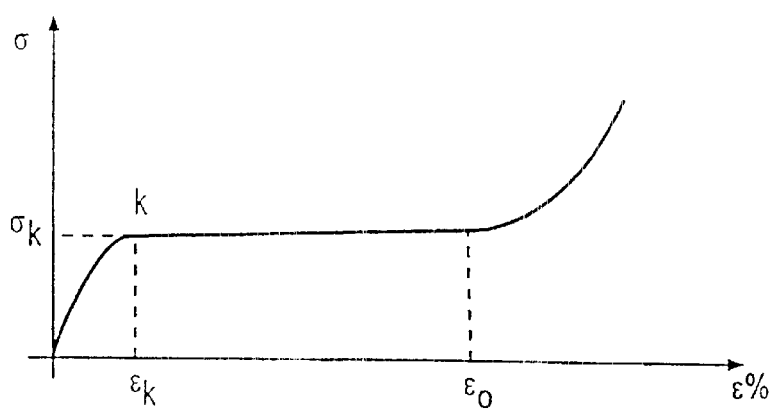
FIG. 5 is a diagram showing qualitatively the stress-deformation of a strip made from the type of shape-memory alloy used to construct the clamp or gripping means of the present invention.

The procedure for applying clamp 15 to bead core 6 is described below. First, strip of a shape-memory alloy is unwound from a reel (not shown) and is transferred with a flat configuration toward first station A. As the reel is unwound, strip is deformed by elongation at ambient temperature $T_0$ to a value I, greater than a predetermined value $I_0$ previously memorized by the strip. In FIG. 5, the deformation condition at ambient temperature $T_0$ is illustrated relative to stresses σ applied to strip and to the consequent deformation ε. The diagram shows an initially increasing segment followed by a horizontal segment starting at point K, at which temperature $M_s$ a martensitic formation begins with large elongations at constant load obtainable with the shape-memory material. The percentage elongation of the material is given by the expression $\epsilon=(l-l_0)/l_0$.

Figure 6:
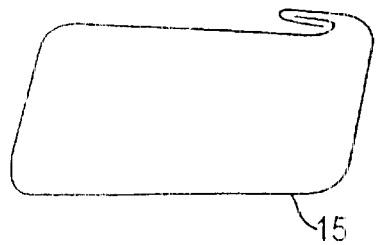
FIG. 6 shows the ends of the strip of shape-memory alloy after they have been joined to form the clamp or bead core gripping means of the present invention.

In a later phase, strip is cut to obtain a piece with a suitable length to form a clamp 15 around bead core 6. The untied piece of strip has a length l and a martensitic structure. At this point, the ends of strip 15 are bent to form two C-shaped hooks. Then, strip 15 is wrapped around bead core 6, linking the C-shaped ends together, as shown in FIG. 6, which illustrates metal strip 15 without coils 30–34 shown inside of it. Later, the C-shaped ends are crushed together and compression stresses are applied to clamp 15 with hammers or the like, so as to close clamp 15 around bead core 6.

In a later phase of the procedure, bead core 6 is advanced to second station B by a rotation of platform 25. At second station B, clamp 15 is heated to predetermined temperature $A_s$, corresponding to the start of the shape-memory alloy's transformation from a martensitic structure to an austenitic structure.

Figure 7:
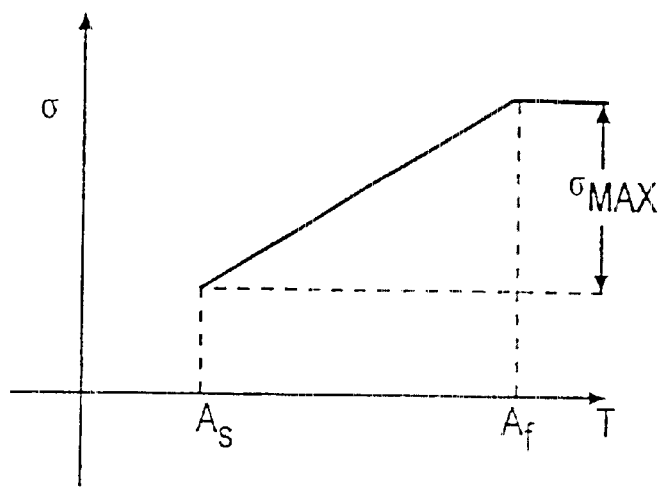
FIG. 7 is a stress-temperature diagram showing qualitatively the behavior of the clamp or bead core gripping means according to the present invention when the gripping means is heated and the material structurally transforms.

The condition of transformation is indicated qualitatively in FIG. 7. In that graphical illustration, the temperature is noted on the abscissa and stresses σ, due to heating from temperature $A_s$ to final temperature $A_f$ of total transformation of the bead core's structure from martensite to austenite, are reported on the ordinate axis.

Figure 8:
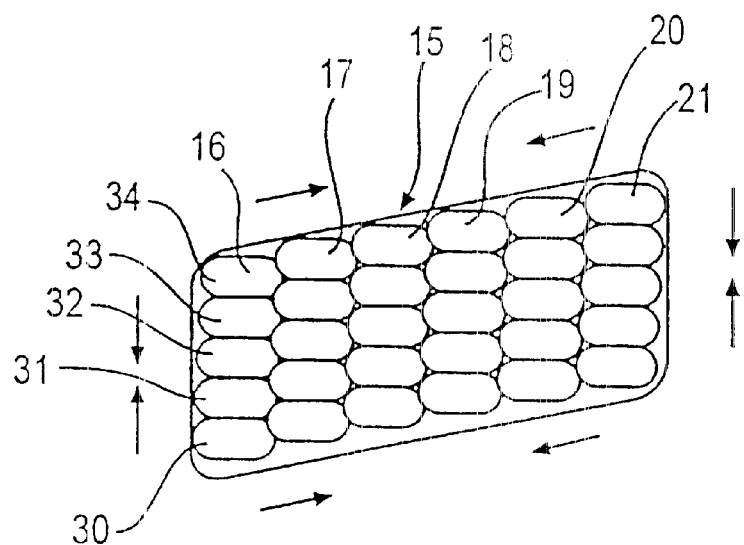
FIG. 8 is a cross-sectional illustration of the bead core gripping means of the present invention, indicating the stresses applied by the gripping means when it has contracted around the bead core after being heated.

When clamp 15 is linked at the ends and heated, because it is made of a shape-memory alloy, it tends to recover the previously memorized length, as far as can be permitted by the presence of the rigid body inside it, represented by bead core 6. Therefore, clamp 15 contracts inwardly, advantageously locking the various bead core components together, as shown by the arrows of FIG. 8. Then, bead core 6 with clamp 15 attached is advanced toward third station C for stopping and/or unloading. The procedure then is repeated.

At first station A, a second clamp 15 is applied around bead core 6. Platform 25 is rotated, moving the second clamp 15 to second station B where the heating phase of the second clamp 15 is effected. For each subsequent clamp 15 applied around bead core 6, the operations described for the formation of the clamp 15 are repeated. Once bead core 6 is unloaded from platform 25, the inward contraction of clamp 15 continues as clamp 15 cools from its highest temperature to a final, lower temperature $A_f$. Although clamp 15 maintains a lesser condition of contraction than that reached in the heating phase, it retains enough of a contractive force to link, at least to some degree, the various elements of bead core 6 during the transport and/or preparation phases for its assembly into the other parts of the tire.

The condition of the residual contraction of clamp 15 is now explained with reference to FIG. 9. That figure presents the interrelation between the variation in stresses σ as a function of temperature T. $M_s$ indicates the variation from the start of the transformation of the alloy from an austenitic structure P toward a martensitic structure M. $A_s$ indicates the variation from the martensitic structure M toward the austenitic structure P. As indicated by the figure, the variation between the stresses is linear. This may also be expressed by the Clausius-Clapeyron equation for shape-memory alloys.

Figure 9:
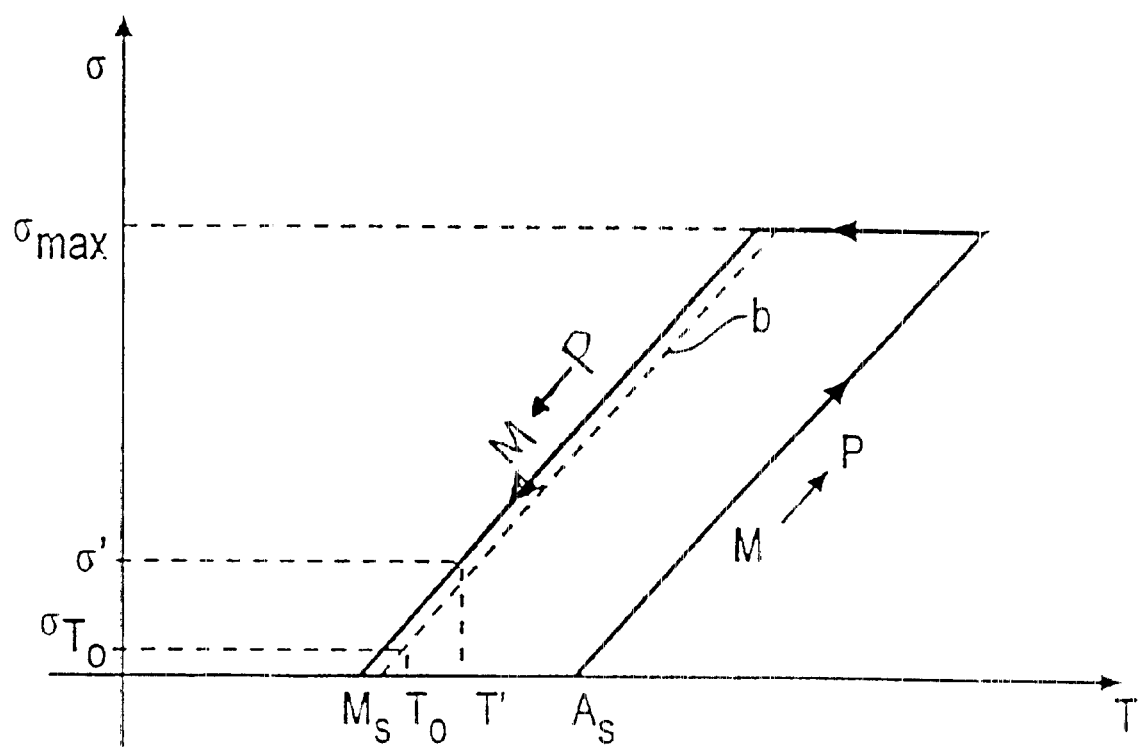
FIG. 9 is a stress-temperature graph of the magnitude of contraction of the clamp or bead core gripping means after it has been heated and subsequently cooled.

For the sake of simplicity, the graph of FIG. 9 represents ideal conditions in which the first curve refers to temperature $M_s$, coincident with temperature $M_f$ at the completion of martensite formation, and the second line refers to temperature $A_s$, coincident with temperature $A_f$ at the completion of austenite formation. The actual observations for a non-ideal alloy are more like the ideal conditions when the temperature variation, which allows the passage from the austenitic structure to the martensitic structure and vice versa, is small. Moreover, in practice, the steeper the transformation curves illustrated in FIG. 2, the closer the actual conditions approach the ideal conditions.

In the graph of FIG. 9, the solid arrows indicate the behavior of the shape-memory material of clamp 15. As may be noted in the figure, when bead core 6 is heated, a maximum contraction stress $\sigma_{max}$ is reached. After reaching the maximum contraction stress, the material is gradually cooled. During cooling, the structure of clamp 15 tends to become martensitic until it assumes, at temperature T', a contraction stress σ', which is a value below the $\sigma_{max}$ but still sufficient to keep the various elements of bead core 6 compacted together. Despite the fact that it is lower than the maximum, the contraction stress σ' is sufficiently great enough to hold the elements of bead core 6 together both during the preparations on platform 25 and during subsequent transport operations to other apparatuses where bead cores 6, with clamp 15 attached, are assembled together with the other components of tire 1.

After removal from platform 25, bead core 6 and associated clamp 15 are transported toward a wrapping drum. It is on the wrapping drum, according to methods well-known to those skilled in the art, that bead core 6 is connected to the ends of carcass 9 that has been wound cylindrically over the drum. The edges of carcass 9 are then turned up over bead core 6 and bead filling 7 to form bead 5. Moreover, carcass 9 goes through a phase of toric conformation followed by the application of the group of belts 10 and tread band 2 onto the carcass rim. Following these operations, tire 1 is introduced into the vulcanization mold and the design on tread band 2 is formed.

Vulcanization of tire 1 is carried out at both a high temperature and a high pressure. Consequently, both of these forces potentially may disturb the various elements of bead core 6, if the elements of bead core 6 were not locked together according to the present invention. As is immediately apparent when viewing FIG. 7, during that the vulcanization phase, the martensitic structure of each clamp 15 transforms again toward the austenitic structure. As a result, during the vulcanization phase, there is a corresponding increase in the contraction stresses by clamps 15. Since the clamps 15 apply a greater pressure on bead core 6 during the vulcanization phase, clamps 15 further reduce the potential risk that coils 30–34 of rings 16–21 may be disturbed during that process because clamps 15 hold them more firmly.

According to the present invention, clamps 15 may be constructed from FeMnSi, arranged around bead core 6 with a pre-deformation of 2.5% at ambient temperature, for example, between 18° C. and 35° C.

In one example, the clamp was made from a material with the following characteristics:
temperature $A_s$=190° C.,
temperature $A_f$=250° C.,
critical stress of transformation $\sigma_k$=200 MPa from austenite to the start of stress-induced martensitic formation (FIG. 5), elongation value $\epsilon_k$=1.5% corresponding to $\sigma_k$,
elongation value $\epsilon_0$=5%,
value of stress $\sigma_{max}$=600 MPa at temperature $A_f$ (FIG. 7),
value of stress $\sigma$=300 MPa at a temperature equal to ½($A_s$+$A_f$),
value of stress $\sigma'$=200 MPa at temperature T' of 25° C., (FIG. 9) corresponding to preparation and transport of the bead core,
value of stress $\sigma_{T0}$=200 MPa at temperature $T_0$ of mounting on the rim.

Clamp 15 could be made of shape-memory materials different from that described above, for example with metal alloys of NiTi, NiTiX (X=Fe, Cu, Nb), CuZnAl, CuAlNi, CuAlBe, and with FeNiCo-based alloys.

The characteristic parameters of same shape memory alloys are provided in Table #1, below:

TABLE 1

|  |  | NiTi | CuZnAl | CuAlNi | FeMnSi |
|---|---|---|---|---|---|
| Specific Gravity | (g/cm³) | 6.45 | 7.9 | 1.15 | 7.8 |
| Young's Modulus | (MPa) | 98000 | 85000 | 90000 | 150000 |
| Breaking Strength | (MPa) | 1100 | 800 | 1200 | 1200 |
| Elongation at Break | (%) | 45 | 15 | 10 | 9 |
| $M_s$ | (° C.) | 40–80 | 40–80 | 40–80 | — |
| $M_f$ | (° C.) | 40–80 | 40–80 | 40–80 | — |
| $A_s$ | (° C.) | 40–90 | 30–90 | 40–170 | 40–250 |
| $A_f$ | (° C.) | 70–120 | 50–110 | 70–200 | 150–350 |
| $\sigma_k$ | (MPa) | 392 | 340 | 360 | 200 |
| $\epsilon_k$ | (%) | 0.4 | 0.4 | 0.4 | 1.5 |
| $\epsilon_0$ | (%) | 6.0 | 3.0 | 3.0 | 5.0 |
| $\sigma_{max}$ | (MPa) | 600–800 | 400–600 | 300–600 | 200–600 |
| σat T = 1/2(As+Af) | (MPa) | 480 | 420 | 460 | 300 |
| σT = 25° C. | (MPa) | 210 | 200 | 205 | 215 |
| σT0 = 25° C. | (MPa) | 200 | 190 | 190 | 200 |

In yet another embodiment of the present invention, clamp 15 can be made from superelastic alloys whose characteristics are described in the publication cited above.

In theory, a material with superelastic characteristics can be progressively deformed, even for high values, by applying a constant load and maintaining a constant temperature.

The stress-deformation curve of such a material comprises, in a Cartesian diagram, a first segment inclined with respect to the abscissa from a stress of zero, at which the structure is austenitic, to a stress value, called the critical stress of transformation, at which the structure begins to transform from an austenitic structure to a martensitic structure.

The theoretical behavior of the material from start to finish during its transformation into the martensitic state is expressed by a platform parallel to the axis of the abscissa, revealing a considerable amount of deformation at a constant load. When the load applied to the material ceases, there is a recovery of deformation expressed as a second straight line parallel to the deformation platform, except that it extends in the opposite direction until it crosses the inclined segment. It then finishes with a zero load at the origin, with a consequent return to the austenitic structure.

Furthermore, superelastic materials have temperature value $A_s$ at the start of the transformation from the martensitic structure to the austenitic structure, which is greater than ambient temperature $T_0$, with $T_0$>$M_s$. Therefore, keeping in mind the aforementioned theoretical characteristics of superelastic materials, they would seem unsuited for use for the purposes of the present invention.

The opposite is true, however. Consider strip S of FIG. 4 directed toward station A of platform 24. Imagine that such a strip is made of superelastic material previously given a shape memory and is submitted to an elongation deformation, and so is able to utilize, as already described, a recovery of the previously memorized shape with the development of a force of contraction to close bead core 6. On the basis of the theory of superelastic materials, after strip S is cut, as the deformation load ceases there should be a recovery of the elongation impressed while strip S was unwound toward station A. Strip S would be in the totally austenitic structural condition, as indicated at the point of origin of the stress-deformation diagram of the superelastic material. Thus, theoretically, it would lack any elongation that could be recovered with a contraction stress when bead core 6 formed by the strip is heated.

Despite the previous conditions established by the theory of superelastic materials, a use for them was found in the present invention. It was found that the real behavior of superelastic materials strays from the theoretical behavior enough to allow them to be used for the purposes of the invention and that the transformation from the austenitic state to the martensitic state actually occurs when the stress applied is increased slightly. In other words, in the Cartesian stress-deformation diagram, the transformation is indicated not by a platform parallel to the axis of the abscissa, but by a straight line slightly inclined with respect to the platform, with a growing progression toward the completion of the transformation to the martensitic state. Correspondingly, when the load ceases, there is a second line parallel to the first, running in the opposite direction.

The second line, due to its slope, meets the axis of the abscissa at a point corresponding, at zero load, to a value of percentage elongation different from zero and equal to value $\epsilon^*$. Since the second line did not return to the point of origin, the structure of the superelastic material must be partly austenitic and partly martensitic. Through the preceding considerations, it was found possible to construct strip S from a superelastic material and incorporate it into a tire, just as was described in relation to the construction of clamps 15 in FIG. 4.

Strip S previously memorized a plane shape. During unwinding toward station A (FIG. 4), strip S is pulled, resulting in an elongation deformation. When the strip is cut to form the scrap and used to make clamp 15, the load applied to strip S ceases and, as said before, the impressed elongation is recovered up to the value of $\epsilon^*$.

Strip S, in a zero load conditions with a percentage elongation $\epsilon^*$, has a partly austenitic and partly martensitic structure. Therefore, during the heating conditions incident to vulcanization and while tire 1 is used in operation, the martensitic portion present in clamp 15 is transformed to an austenitic state and develops a stress of contraction on bead core 6, tending to recover the previously memorized shape. Clamp 15 assumes the maximum value $\sigma_{max}$ when the entire martensitic structure is transformed to an austenitic structure, as indicated in the diagram of FIG. 7.

In general, then, all shape-memory materials are suited to the purposes of the invention if, when the load applied to them without constraints ceases, as occurs for the scrap of strip S after cutting, there is, after impressing an elongation, a residual percentage elongation $\epsilon^*$=(l-$l_0$)$l_0$, where:

$l_0$ is the initial memorized elongation before strip is used; and l is the elongation impressed as strip is unwound.

During the use of tire 1, the zone of the tire close to beads 5 is subject to heating not only because of the various thermal stresses acting on the materials but also, among other factors, due to the transmission of heat from the affected rim surfaces, caused by the braking conditions of disk brakes. Clamps 15 are also subject to the same heating conditions, resulting in a contraction of the clamps during operation of tire 1 as the clamps transform from the martensitic state to the austenitic state, as shown in the graph of FIG. 7. Therefore, due to the increased contraction of clamps 15, there is a corresponding increase in the compactness of the various elements of bead core 6 and a concurrently tighter grip by beads 5 on rim seats 23.

In addition to the advantages set forth above, a further advantage of the present invention may be appreciated. Currently, there is a demand for tires that permit a vehicle to continue moving even though the tire has become flat so that the driver may reach a service station and replace it. The present invention makes it possible to travel safely for a reasonable distance on a flat tire.

When a tire is deflated or flat, the sides of the tire fold in two parts, which results in a relative reciprocal creep and overheating of the tire parts. Since a tire will overheat if used in a flat state, clamps 15 will also become hotter. As described above, as clamps 15 heat up, they undergo a further structural transformation, with a consequently greater contraction on bead core 6. This phenomenon is illustrated in FIG. 7. Therefore, under the most difficult conditions for a tire, clamps 15 contract to an even greater degree over bead cores 6, further compacting the various elements composing bead core 6 and causing beads 5 to more strongly grip rim seats 23.

Additionally, the characteristics of the present invention permit the contraction forces of clamps 15 to be distributed evenly around bead cores 6 so that the maximum gripping potential is realized under even the most extreme conditions, such as when tire 1 becomes flat or when tire 1 is vulcanized. Lower values can be achieved in situations where they are desired, such as when bead core 6 is prepared at stations where it is assembled onto the tire. The lowest contraction stresses can be obtained when they are needed the most, specifically when the tire is mounted onto the rim, as explained below.

As pointed out in the graph of FIG. 9, the contraction stress of clamps 15 at ambient temperature To is below that reached in the heating conditions when the structure passes from the martensitic state to the austenitic state. Therefore, the degree of compression of the various elements forming bead core 6 is smaller than that required in the tire vulcanization and operation phases, and in any case is such that it permits a certain degree of slippage between the various elements making it up. In practice, bead core 6 can be deformed at ambient temperature into a elliptical configuration suited for slipping over the flange of the rim.

By changing the characteristics of the alloy's composition and the heat treatments preceding its application, it is also possible to vary the distance between the two straight lines of FIG. 9, as indicated for the first line with dotted-line b. In this case, at ambient temperature $T_0$ a lower value of stress of contraction $?_{T_0}$ of clamps 15 than that corresponding to the solid line is obtained, resulting in a lower compression by clamps 15 over the components of bead core 6, thus making it easier to mount bead 5 onto the wheel rim, when necessary.

Additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. A tire, comprising:
   a carcass;
   a tread band;
   at least a reinforcing belt between the tread band and the carcass;
   a pair of bead cores disposed one at each end of the carcass with ends of the carcass wrapped around the pair of bead cores to form a pair of beads; and
   at least one clamp disposed around each bead core, wherein the at least one clamp is made of a shape-memory material.

2. The tire of claim 1, wherein the at least one clamp is deformed at an ambient temperature, contracts to a previously memorized shape at a higher-than-ambient temperature, and, once heated, maintains a degree of contraction around a respective bead core from the higher-than-ambient temperature to the ambient temperature.

3. The tire of claim 1, wherein at least two clamps are disposed around each bead core at positions diametrically opposed to each other.

4. The tire of claim 1, wherein each bead core comprises a plurality of radially staggered rings, placed side-by-side next to each other, the radially staggered rings being radially superposed coils with substantially hexagonal cross-sections, and the at least one clamp is disposed around the plurality of radially staggered rings.

5. The tire of claim 1, wherein the at least one clamp comprises one alloy selected from an alloy of NiTi, an alloy of NiTiFe, an alloy of NiTiCu, an alloy of NiTiNb, an alloy of FeNiCoTi, an alloy of FeMnSi, an alloy of CuZnAl, an alloy of CuAlNi, an alloy of CuAlBe, an FeMnSi-based alloy, and an FeNiCo-based alloy.

6. The tire of claim 1, wherein the at least one clamp recovers a previously memorized shape by developing forces of contraction between a start temperature and a final temperature, wherein
   the start temperature begins a transformation of a structure of the at least one clamp from a martensitic state to an austenitic state,
   the final temperature completes the transformation of the structure of the at least one clamp from the martensitic state to the austenitic state.

7. The tire of claim 6, wherein the start temperature is between about 30° C. and 250° C.

8. The tire of claim 7, wherein the start temperature is between about 50° C. and 150° C.

9. The tire of claim 6, wherein the final temperature is between about 50° C. and 350° C.

10. The tire of claim 9, wherein the final temperature is between about 70° C. and 200° C.

11. The tire of claim 6, wherein, at the final temperature, the at least one clamp exerts a stress of contraction between about 100 MPa and 800 MPa.

12. The tire of claim 11, wherein the stress of contraction is between about 100 MPa and 600 MPa.

13. A method for manufacturing a tire having a carcass, at least one bead core including a plurality of rings and coils in a predetermined arrangement, and at least one clamp arranged around the at least one bead core, wherein the at least one clamp is made from a strip of shape-memory material, the method comprising the steps of:

deforming the strip at an ambient temperature;

winding the strip around the at least one bead core;

heating the at least one clamp to a higher-than-ambient temperature; and combining the at least one bead core having the at least one clamp with the carcass to form the tire.

14. The method of claim 13, further comprising, after the step of winding, the step of locking both ends of the strip to one another to form the at least one clamp.

15. The method of claim 14, further comprising, after the step of locking, the step of compressing the at least one clamp to bind the at least one clamp to the at least one bead core.

16. The method of claim 13, wherein the at least one clamp is heated to a predetermined temperature initiating a transformation of the shape-memory material from a martensitic structure to an austenitic structure.

17. The method of claim 13, further comprising the step of:

vulcanizing the tire with the at least one clamp at a vulcanization temperature between 140° C. and 180° C., corresponding to a contraction stress by the at least one clamp on the at least one bead core of at least 200 MPa.

18. A bead core, comprising:

a plurality of wires or straps in a predetermined arrangement; and at least one clamp arranged around the plurality of wires or straps, wherein the at least one clamp is made from a shape-memory material.

19. The bead core of claim 18, wherein the at least one clamp comprises one alloy selected from an alloy of NiTi, an alloy of NiTiFe, an alloy of NiTiCu, an alloy of NiTiNb, an alloy of FeNiCoTi, an alloy of FeMnSi, an alloy of CuZnAl, an alloy of CuAlNi, an alloy of CuAlBe, an FeMnSi-based alloy, and an FeNiCo-based alloy.

20. A method for manufacturing a bead core including a plurality of rings and coils in a predetermined arrangement and at least one clamp arranged around the bead core, wherein the at least one clamp is made from a strip of shape-memory material, the method comprising the steps of:

deforming the strip at an ambient temperature;

winding the strip around the bead core; and heating the at least one clamp to a higher-than-ambient temperature.

* * * * *